Sept. 7, 1965  N. R. BROWNYER  3,204,944
TAPERED SPRINGS AND METHODS OF MANUFACTURING SAME
Filed March 26, 1963  2 Sheets-Sheet 1
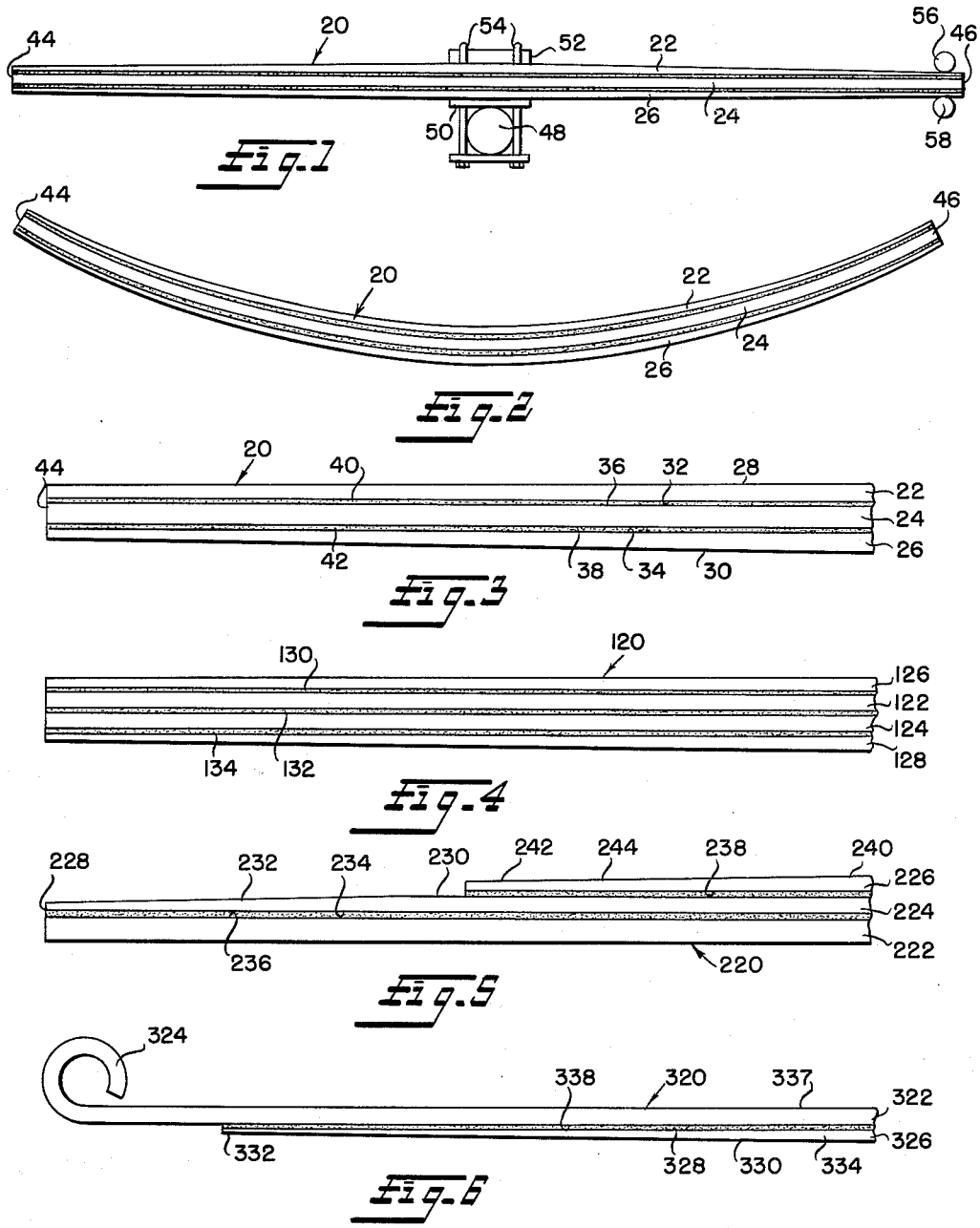
INVENTOR.
Nelson R. Brownyer
BY
Attorneys

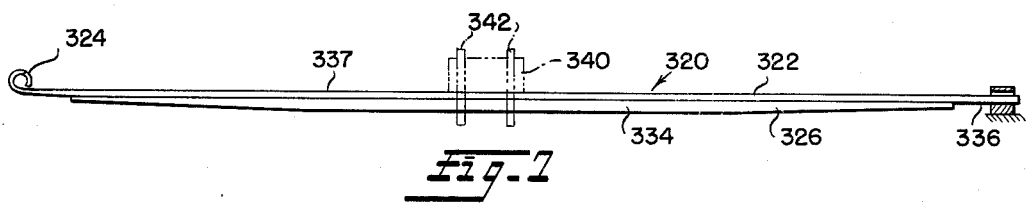
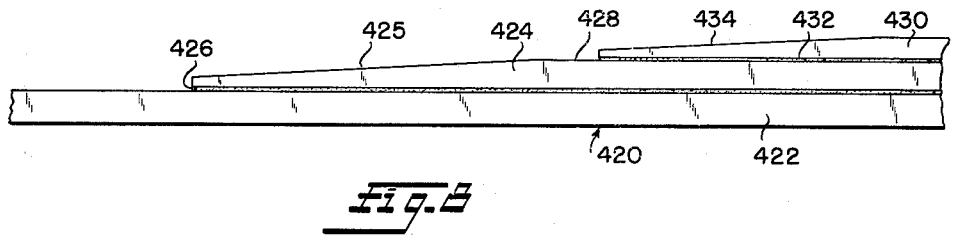
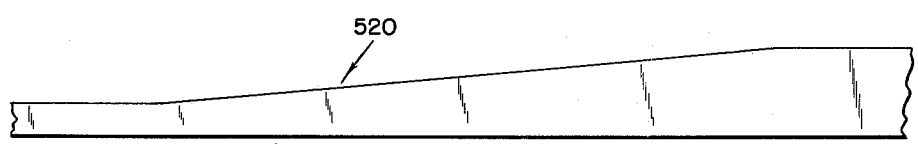

United States Patent Office 3,204,944
Patented Sept. 7, 1965

1

3,204,944
TAPERED SPRINGS AND METHODS OF
MANUFACTURING SAME
Nelson R. Brownyer, Bloomfield Township, Mich., assignor, by mesne assignments, to Rockwell-Standard Corporation, a corporation of Delaware
Filed Mar. 26, 1963, Ser. No. 268,080
11 Claims. (Cl. 267—47)

The present invention relates to laminated, single-leaf, tapered springs; to methods of manufacturing such springs; and to the use of such springs in spring assemblies for vehicles.

It is conventional to support vehicles by beam, or plate, springs loaded in one direction at the ends and in the opposite direction at the center portion. It is desirable that such springs be flexible throughout their length so that good deflection characteristics can be achieved. It is further desirable that all sections along the length of the spring be subjected to a uniform bending stress so that all material of the spring is efficiently utilized to effect the springing action. These ends are only achieved by providing a beam of either variable width or variable thickness or both. This was recognized relatively early as evidenced by United States Letters Patent No. 129,297 of 1872 which shows an integral beam spring tapered from a midportion toward both ends. Manufacturing processes of the era of this patent did not allow practical commercial use of this tapered beam spring, and even today, manuafcturing costs to make a single-leaf tapered beam spring are extremely high because of the special, expensive rolling machinery required by the intricate taper rolling process.

Cognizant of the above goals in spring design and the economic limitations of available manufacturing methods, those skilled in the art conventionally utilize built-up springs, consisting of a number of separate spring leaves diminishing in length from top to bottom to achieve an overall tapered spring shape. As shown by United States Letters Patent No. 2,597,299 and No. 2,708,111 to Crites et al. and Sturtevant, respectively, such multi-leaf springs are clamped together at their center portions, and when these multi-leaf springs are flexed under a load, the ends of the individual leaves slip longitudinally relative to each other at their contacting surfaces. The load is transferred from one leaf to the next adjacent leaf by their mutual contact.

Such multi-leaf springs have several disadvantages: *First*, considerable stress is placed on the longer of two adjacent leaves at the points where the shorter leaf ends. *Second*, rigidly clamped central sections of beam springs are inactive in the springing action, and in conventional multi-leaf springs this clamped central section is of substantial length and thus results in a heavy and expensive spring because of the extra unutilized spring material necessary at the clamped portion. *Third*, the inter-leaf friction due to the chafing action of the several individual leaves upon each other is objectionable because it is difficult to maintain this friction constant throughout the working life of the spring, and it will sometimes increase so as to undesirably restrict the springing action. *Fourth*, this friction also produces an undesirable condition known as fretting. As shown in the above patents to Crites et al. and Sturtevant, inter-leaf liners are required to alleviate this problem. *Fifth*, a multi-leaf cantilever beam,

2 such as represented by half of a semi-elliptic multi-leaf vehicle spring, is necessarily much heavier and larger than a single-leaf spring beam as the safe load at the maximum bending moment is only the sum of the safe loads on the individual leaves, whereas in a single-leaf cantilever beam of the same overall shape and total thickness, it is possible to get many times the safe load obtained in the multi-leaf beam. Conversely, it is possible to get the same safe load in a single-leaf cantilever beam with a reduced thickness and a drastic decrease in weight. *Sixth*, in conventional multi-leaf springs, the leaves must all be the same thickness since otherwise the thinnest leaf would fail before maximum capacity for the other leaves is obtained. Thus design flexibility of the multi-leaf spring construction technique is limited.

Accordingly, it is a primary object of this invention to provide a beam spring which is economical to manufacture and which obviates the disadvantages of the prior art beam springs.

To achieve this objective, the present invention provides a laminated, tapered spring in which the individual leaves or laminations are bonded together over their coextensive surfaces so that the spring assembly acts as one single beam. These leaves or spring elements may have a uniform transverse cross section throughout their length or may be tapered in width or thickness or both; they also may be of uniform length or of varying length; and they may have tapered ends with a uniform center section, all depending on the design requirements.

Thus, the spring of this invention inherently obviates the disadvantages of the prior art structures associated with inter-leaf friction. Further, as the laminations are bonded together, the clips and clamps required to hold a conventional multi-leaf spring in assembled form are eliminated, and the center section of the beam spring of the present invention may thus be active in the flexing action of the spring. Finally, such springs may be drastically reduced in weight and size as the laminations, when bonded together, have the safe load capacity of a single beam rather than the sum of the safe load capacities of the individual leaves.

The spring construction of the present invention is economically feasible because the rolling equipment and processes necessary to taper the spring elements of the size of the laminations of the present invention are much simpler and less expensive than those required to taper an integral spring beam of an overall size comparable to the assembled laminated spring. Taper rolling machines presently used in providing the short tapers on the ends of spring leaves in the conventional multi-leaf vehicle spring can be used to advantage in the manufacture of the tapered laminations of the present invention.

Springs constructed in accordance with the present invention are further adapted for economic commercial use in that specially designed beam springs required for a specific application may be made up of a plurality of elements chosen from a stock of standardized tapered or untapered laminations having various lengths and thicknesses. Because of the bonded, laminated structure of the present beam spring, the laminations need not be of the same thickness nor of graduated length as in conventional multi-leaf springs since they react, when bonded together, as a single solid leaf. Thus a wide variety of tapered configurations for beam springs is feasible and easy to accomplish by the present invention. Even springs having a slight up and down or "roller coaster" effect are feasible.

The laminated beam springs of the present invention are manufactured by tapering the individual laminations as desired, positioning the laminations in assembled form, and then bonding the laminations together by any adhesive or cohesive process produced mechanically, metallurgically, chemical, thermally, or by any other suitable means to provide a one-piece, solid, tapered beam spring. A non-tapered leaf has uniform thickness.

Accordingly, further objects of the present invention include:

(1) The provision of single-leaf beam springs which are easier to manufacture and thus more economical than those of the prior art;

(2) The provision of leaf springs which are much lighter and smaller and of less depth than those of the prior art;

(3) The provision of laminated beam springs in which inter-lamination slippage, friction, and fretting are eliminated;

(4) The provision of laminated beam springs in which the center section is not restrained from operating in the flexing action;

(5) The provision of improved spring assemblies for vehicles;

(6) The provision of improved manufacturing methods for beam springs;

(7) The provision of improved methods for producing inter-lamination bonds in laminated springs;

(8) The provision of leaf springs in which the need for clips and clamps to retain the leaves in assembled position is eliminated; and (9) The provision of leaf springs in which the component spring elements may be tapered or untapered and may have various lengths and/or thicknesses thus providing great design flexibility in the production of springs for specific applications.

These and other objects of the present invention will appear from the following description and the appended claims when read in conjunction with the accompanying drawings wherein:

FIGURE 1 is a side view of a laminated, tapered beam spring according to the present invention shown attached to a vehicle axle;

FIGURE 2 is a side view of the tapered beam spring of FIGURE 1 shown in a flexed position;

FIGURE 3 is an enlarged side view of one end of the beam spring of FIGURE 1;

FIGURE 4 is a side view of one end of a laminated, tapered beam spring according to a modified embodiment of the present invention;

FIGURE 5 is a side view of one end of a laminated, tapered beam spring according to another modified embodiment of the present invention;

FIGURE 6 is a side view of one end of a laminated, tapered beam spring according to a further modification of the present invention;

FIGURE 7 is a side view of the tapered beam spring of FIGURE 6 shown with certain vehicle attachment fittings;

FIGURE 8 is a side view of one end of a laminated, tapered beam spring according to a still further modified embodiment of the present invention;

FIGURE 9 is a side view of the tapered beam spring of FIGURE 8 shown in a flexed condition and with vehicle attaching fittings at either end; and FIGURE 10 is a side view of one end of a solid tapered beam spring of similar dimensions to the laminated beam spring of FIGURE 8.

Referring to the drawings in detail, several exemplary embodiments of laminated springs according to the present invention are shown in the various figures. FIGURES 1 to 3 show a laminated beam spring 20 having three laminations 22, 24, and 26 of substantially equal length. The center leaf 24 is of uniform transverse cross section throughout its length while the outside laminations or leaves 22 and 26 are formed with a taper from their center section toward either end. These tapers are preferably formed on the outside surfaces 28 and 30 of laminations 22 and 26 so that the inside surfaces 32 and 34 are left flat to closely fit against the respective adjacent surfaces of the center, untapered lamination 24. Shown greatly enlarged at 40 and 42 are inter-lamination bonds which extend over the entire contacting surfaces of the adjacent laminations and rigidly join them to prevent inter-leaf slippage. As shown in FIGURE 2, the bonded laminated spring 20 flexes to the position shown without relative movement between the laminations and without any opening up of the laminations.

FIGURE 1 further shows beam spring 20 with a vehicular axle 48 connected thereto by spring saddle 50, clamp 52, and bolts 54. End 46 of laminated spring 20 is schematically shown slidably supported between spring abutments 56 and 58; however, one or both ends of spring 20 may be provided with eyes or any other known spring attachment means.

Modifications

FIGURE 4 shows a slightly modified laminated beam spring 120 which is adapted for heavy load applications such as in off-road equipment and construction machinery. Spring 120 is composed of two central non-tapered laminations 122 and 124 and outside tapered laminations 126 and 128 constructed in a manner similar to that described for the previous embodiment. These laminations are of substantially equal length and are permanently bonded with a full surface joint shown much enlarged at 130, 132, and 134.

FIGURES 5 to 9 show somewhat different laminated springs in that the adjacent leaves may be of decreasing length similar to a conventional multi-leaf assembly. These constructions may be desirable in certain medium or light load applications or in applications requiring attaching eyes or other securing means at one or both ends of a spring.

FIGURE 5 shows a medium duty laminated beam spring 220 having an outside non-tapered lamination or leaf 222 with an adjacent partially tapered leaf 224 coextensive therewith and a shorter partially tapered leaf 226 adjacent to leaf 224. Intermediate lamination 224 is tapered toward its end 228 on its outside surface 232 from a point 230. This end taper at 232 leaves a flat interior surface 234 to be bonded to surface 236 of untapered lamination 222. Intermediate lamination 224 is of uniform transverse cross section from point 230 toward its midpoint (not shown). Lamination 226 has a flat surface 238 adjacent and co-extensive with the untapered portion of lamination 224 and is tapered on its exterior surface 244 from a point 240 to its end at 242.

FIGURES 6 and 7 show another modification of the springs of the present invention for light load applications as in passenger cars. A laminated spring 320 has an untapered leaf 322 which may be provided at one or both ends with an attaching eye 324. A tapered leaf 326 is bonded to leaf 322 at 328. Leaf 326 is preferably shorter than leaf 322 and ends a substantial distance from eye 324. The taper on the exterior surface 330 of lamination 326 may extend from the center of the spring to end 332 of lamination 326 or may extend from a central untapered portion 334 to end 332. Any desired number of successively shorter leaves may be bonded in this manner to form a tapered beam spring 320. It may also be desirable in some installations to provide lamination 322 with some end taper preferably on its outside surface 337 so as to leave a flat, untapered surface 338 for the bond with lamination 326.

Spring 320 is shown with a straight end 336 to be slidingly supported between spring abutments (not shown). If desired, end 336 may be slightly curved or bent downwardly to provide limited longitudinal movement of the leaf within its supports as is conventional in vehicle leaf spring suspensions.

At the center section of spring 320 an axle-housing spring seat 340 may be clamped thereto at 342 on either the top or bottom of the spring. In order to center the spring 320 and prevent longitudinal movement at the spring seat 340, the sides of the leaves 322 and 326 may be provided with grooves (not shown) for the clamps 342 or the spring may be cemented to the spring seat. A conventional center bolt hole through the leaves is preferably omitted to further enhance the stability of the spring center section.

FIGURES 8 and 9 show another modification of the beam springs of the present invention wherein a spring 420 has an untapered leaf 422 suitably provided with attaching eyes 423 at either end and wherein a shorter lamination 424 having an outer surface end taper 425 is bonded to leaf 422 at 426. Bonded to an untapered central portion 428 of lamination 424 is a still shorter lamination or leaf 430 bonded thereto at 432 and having an outer surface end taper 434. Again any desirable number of leaves or laminations may be utilized depending wholly on the total thickness required for any specific application.

FIGURE 10 shows a integrally formed, solid beam spring 520 that would have spring characteristics comparable to those of a laminated beam spring of similar dimensions according to the present invention as shown in FIGURE 8. However, the laminated construction is much cheaper because the short tapers 425 and 434 of laminations 424 and 430 of FIGURE 8 may be easily formed on a conventional bar end tapering machine in contrast to the difficult process and the expensive rolling machinery involved in forming the long taper sections of the solid beam shown in FIGURE 10. Further, straight tapers on the individual leaves may be designed so that the total taper configuration approaches a parabolic curve thus providing highly uniform stress distribution throughout the length of the spring. In contrast, the production of a parabolic taper on an integral spring beam such as that shown in FIGURE 10 is an intricate, complex, and expensive process.

Fabrication

After laminations of proper length, thickness, and taper are selected and assembled in a stack, the bond between the leaves may be accomplished by any of the well known adhesive or cohesive processes by mechanical, metallurgical, chemical, electrical, thermal, or any other suitable means depending on economics and preference.

One preferred method of bonding the laminations involves a process known as nichro-brazing. In this method, thin layers of nichro (a nickel-chromium base alloy brazing material) are placed between the steel spring leaves, and the assembled leaves with the brazing material therebetween are placed in a fixture to prevent their displacement relative to each other. The assembly is placed in an air tight heating chamber and pressure and heat are applied either by a furnace or by an induction heating apparatus. A temperature between 1900 and 2000° F. has been found to give satisfactory results. During the fusion of the brazing material with the surface layer of the metal laminations under the application of heat and pressure, the chamber is evacuated to, and flushed with a neutral gas such as argon at, an absolute pressure of below 500 microns of water. The vacuum aids to bond the leaves together to prevent corrosion at the joints.

After bonding, the spring is then processed much like a tapered solid beam spring. That is the spring may be heat treated, cambered, shotpeened, prestressed, coated, etc., the processes of which are more fully described in detail in copending application Serial No. 23,471, April 20, 1960.

In summary, a laminated tapered spring according to the present invention reacts as a solid tapered beam wherein each leaf maintains its initial, integrally-bonded position upon an adjacent leaf without inter-leaf slippage.

The present method of construction results in a smaller, lighter beam spring which has no inter-leaf frictional problems and requires no clips or extensive, clamped center section. Because of the integral bonding technique, the laminations may be of various lengths and thickness and may be tapered or untapered; thus the present invention provides extensive design flexilibity. Finally long or complex tapered spring configurations may be economically produced because of the laminated construction wherein the relatively thin individual spring elements or laminations may have short, simple end tapers produced on conventional, relative inexpensive rolling equipment.

The invention may be embodied in other specific forms without departing from the spirit or essential characteristics thereof; the present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed and desired to be secured by Letters Patent is:

1. A leaf spring unit of non-uniform transverse cross section along at least the major portion of its length comprising a plurality of preformed adjacent metal leaves all permanently bonded together over their entire coextensive adjacent surfaces to prevent slippage therebetween at said surfaces.

2. A laminated spring unit comprising a plurality of stacked preformed spring metal leaf elements, all of said stacked spring elements being permanently bonded together entirely along their adjacent surfaces to prevent slippage therebetween during flexing of said spring.

3. A laminated tapered cantilever leaf spring unit comprising a plurality of preformed metal spring leaves in a stack, at least one of said leaves being tapered along one side and having on its other side a flat surface secured to a contacting flat surface of the adjacent leaf with a full surface permanent bond to prevent inter-leaf slippage during flexing of said spring.

4. The spring unit of claim 3 wherein said adjacent leaf is of uniform transverse cross section throughout its length.

5. The spring of claim 3 wherein said one side of said one leaf is tapered from its center portion to either end with a gradually diminishing transverse cross section.

6. A laminated, single-leaf, beam spring unit comprising a plurality of adjacent metal spring leaf elements of differing length, at least one of said elements having a uniform cross-section throughout a portion of its length and having on one side at least one tapered end, said one element being substantially co-extensive on its other side with a flat surfaced portion of an adjacent non-tapered spring element and full surface permanently bonded thereto to prevent slippage between said adjacent elements.

7. A laminated leaf spring unit for a vehicle consisting essentially of at least two preformed spring leaves of substantially the same metal having coextensive flat surfaces that are fused together to form metallic permanent surface bond between said leaves.

8. The spring unit defined in claim 7 wherein one of said units is longer than the other and formed at its ends with means for attachment to the vehicle.

9. A laminated leaf spring unit for a vehicle comprising a first metal spring leaf of substantially uniform cross section from end to end having on one side a flat transverse surface, another metal leaf which is tapered to a desired contour on one side and has on its other side a flat surface at least partly coextensive with and contacting said flat surface of the first leaf, and means permanently bonding said leaves together entirely throughout said surfaces.

10. The spring unit defined in claim 9 wherein said other spring leaf is longer and formed at its ends for attachment to the vehicle.

11. A laminated leaf spring unit for a vehicle consisting of two steel spring leaves of the same width having coextensive flat surfaces adjacent and fused together to form a permanent bond at the entire area of said surfaces, one of said spring leaves being tapered toward an end on the side opposite said bond.

References Cited by the Examiner

UNITED STATES PATENTS

| | | | |
|---|---|---|---|
| 68,217 | 8/67 | Lewis | 267—47 |
| 1,520,484 | 12/24 | Shore | 267—47 |
| 1,638,516 | 8/27 | Ware | 29—173 |
| 1,977,458 | 10/34 | Stargardter | 29—173 |
| 2,056,816 | 10/36 | Zimmerli | 267—47 |
| 2,103,122 | 12/37 | Stark | 267—47 |
| 2,400,680 | 5/46 | Boos | 29—173 |
| 2,587,522 | 2/52 | Plikington | 29—173 |
| 2,608,752 | 9/52 | Schilling | 267—47 |
| 2,814,481 | 11/57 | Van House | 267—47 |
| 2,820,286 | 1/58 | Andrus | 29—497.5 |
| 3,011,254 | 12/61 | Melill et al. | 29—494 |
| 3,053,527 | 9/62 | Hallam | 267—47 |
| 3,062,948 | 11/62 | Arnoldy | 29—494 |

FOREIGN PATENTS

| | | |
|---|---|---|
| 38,611 | 6/31 | France. |
| 224,406 | 5/59 | Australia. |

OTHER REFERENCES

New Product Development Report, American Steel and Wire Division of U.S. Steel. Publication #A201–X released May 14, 1962.

ARTHUR L. LA POINT, *Primary Examiner.*